Aug. 15, 1961   R. J. HOLTON   2,996,275
CLIP TYPE CABLE FASTENING DEVICES
Filed June 16, 1958   2 Sheets-Sheet 1

INVENTOR.
ROBERT J. HOLTON
BY
Bates, Teare & McBeau
ATTORNEYS

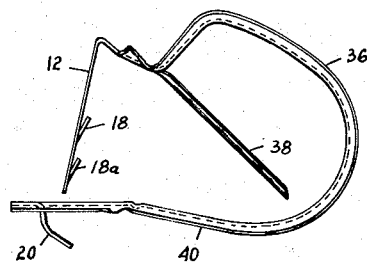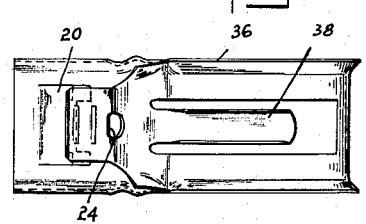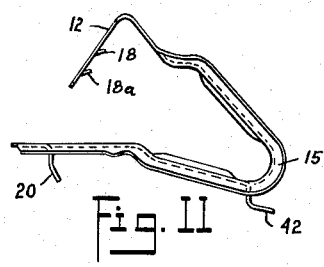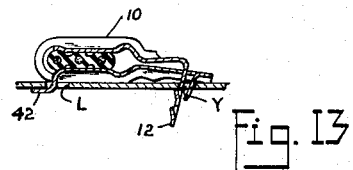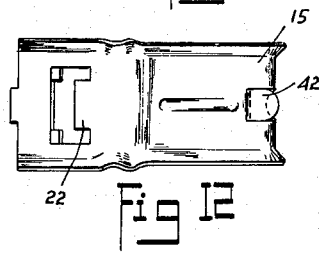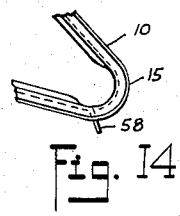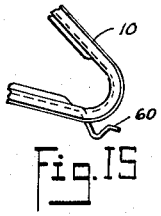
INVENTOR.
ROBERT J. HOLTON United States Patent Office 2,996,275
Patented Aug. 15, 1961

2,996,275
CLIP TYPE CABLE FASTENING DEVICES
Robert J. Holton, Cleveland, Ohio, assignor to Tinnerman Products Inc., Cleveland, Ohio, a corporation of Ohio
Filed June 16, 1958, Ser. No. 742,105
7 Claims. (Cl. 248—73)

This invention relates to fastener means for mounting cables, conduits, electrical conductors, tube lines, rods and like objects in place and in stress-relieved relation, upon a support, such as a panel.

More particularly the invention is directed to spring clip devices constructed from relatively thin material of sheet or strip form, such as sheet spring steel, sheet metal, cold rolled metal, and designed for use in combination with conduits, cables and like objects, for positively mounting the same in applied position on a support without danger of loosening or accidental removal, incident to vibration, jarring and strain which may take place in the supporting member. The fastener or clip also provides means for readily and quickly detaching the clip from assembled relation with the supporting panel when the latter becomes desirable or necessary. The instant invention also provides means for prelatching the clip or fastening device to the tube or wire conduit prior to its being assembled on the supporting panel, thereby providing a highly efficient arrangement for mounting and securing conduit or the like on the supporting panel.

A specific illustration of the use to which the clip devices of this invention may be put is the mounting of conduits, cables and the like as employed in electrical appliance wiring. In mounting such wiring, it is desirable that the clips be capable of being easily and quickly applied in firm engagement in applied position on the supporting part or frame, and yet may be relatively easily removed from such supporting position when so desired.

In the instant arrangement, the clip comprises a contractable, resilient-like body portion for receiving and holding in stress relieving relation the cable, conduit, tube or other like object, and a shank or bayonet portion depending from the body portion and adapted to be received in substantially snap fastening relation in an aperture in the supporting part, for clamping the clip to the associated conduit and in mounted position on the supporting panel.

This invention therefore contemplates the provision of a relatively inexpensive clip device which may be manufactured from sheet or strip metal having spring-like characteristics, and is adapted for mounting cables, conduits and the like on an apertured supporting wall or panel.

Another object of the invention is to provide fastening means for mouting cables and the like, and embodied in the form of clip devices having relatively yieldable shank or bayonet portions and including holding means on the shank portion for snap fastening relation, for readily mounting the clip and the associated cable or like object on a supporting part and for firmly clamping the cable in mounted position on the supporting part.

Another object of the invention is to provide fastening means of the latter type which includes means for quickly and easily detaching the clip device from secured relation on the supporting part.

A further object of the invention is to provide clip means by which a tube line, electrical line or like object can be easily and quickly mounted on a support, and which will hold the object positively in applied position on the supporting part.

A more specific object of the invention is to provide a fastening device comprising a resilient, contractable loop-like body or wire harness portion for receiving a conduit, tube or like object therein and embodying means for positively clamping the conduit or tube in secured relation, and including a yieldable shank portion depending from the body portion and being adapted to be received through an aperture in the supporting part or panel, said shank portion including holding means thereon adapted for snap-fastening relation with the supporting panel for holding the cable, conduit or other object being mounted in positive applied position on the supporting part.

Other features and advantages of the invention will be apparent from a consideration of the following description taken in conjunction with the accompanying drawings wherein:

FIG. 9 is an enlarged, side elevational view illustrating another modification of the invention, and in particular a clip device generally similar to that of FIG. 1 but including a finger portion struck from the loop or body portion of the clip and particularly designed for considerable variations in wire sizes as well as large variations in support panel thickness.

FIG. 10 is a top plan view of the clip device of FIG. 9.

FIG. 11 illustrates a modification of FIG. 1 and more particularly illustrates a clip device embodying a tab struck from the rearward or return bend portion of the loop section of the clip, and adapted to be received in a complementary opening in the supporting part or panel for locking the clip device in rigid position on the panel.

FIG. 12 is a bottom plan view of the modified clip device illustrated in FIG. 11.

FIG. 13 is a reduced size, vertical sectional view showing the FIG. 11 embodiment in assembled position on a supporting panel.

FIGS. 14 and 15 are fragmentary, side elevational views of modified forms of the tab structure illustrated in FIGS. 11 to 13.

Figure 1:
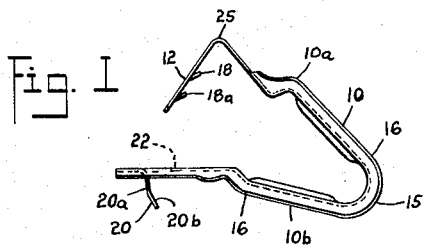
FIG. 1 is an enlarged, side elevational view of one embodiment of the clip device of the invention.
Figure 2:
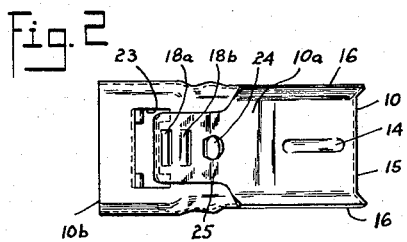
FIG. 2 is a top plan view of the clip of FIG. 1.
Figure 5:
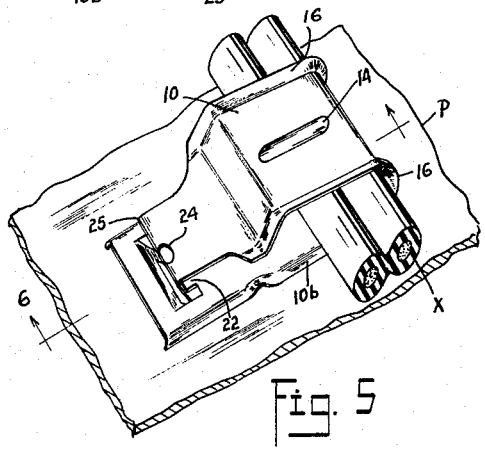
FIG. 5 is a perspective view showing the clip device in applied position on a supporting part of panel and mounting an electrical conduit thereon.
Figure 4:
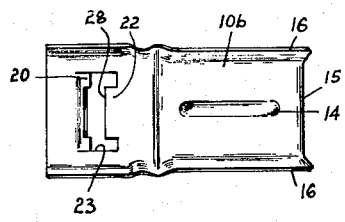
FIG. 4 is a bottom plan view of the clip device of FIG. 1.
Figure 6:
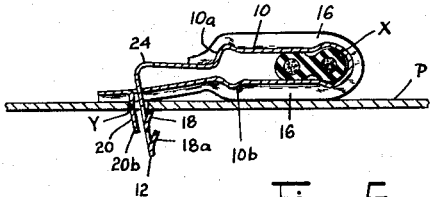
FIG. 6 is a vertical sectional view taken generally along the plane of line 6—6 of FIG. 5, looking in the direction of the arrows.

Referring again to the drawings and in particular to FIGS. 1 to 6 thereof, in carrying out the invention, the securing devices or clips may be formed from a strip section or stamped blank of metal sheet materials such as spring steel, cold rolled metal, sheet metal and the like. The strip or blank of spring or resilient metal may be reversely bent, as shown, to provide a generally open-ended, somewhat elongated, loop-like body portion 10 which is adapted to receive therethrough the cable, conduit, tubing or other object to be mounted. The upper section 10a of the body portion provides a lever portion, and at its outer or left-hand end (as viewed in FIG. 1) is of reduced width and defines a generally depending shank or bayonet portion 12, for a purpose to be hereinafter described. The lower section 10b of the loop provides a base portion which is adapted to be mounted in generally abutting relation with a supporting wall or panel P (FIG. 5). Body portion 10 has inwardly extending bosses or projections 14 formed therein generally adjacent return bend portion 15, for positively gripping and clamping the associated cable, tubing or the like in the assembled position of the clip on the panel P. In the free or non-assembled condition of the clip, as shown in FIG. 1, body sections 10a and 10b thereof generally diverge with respect to one another and the free end of shank portion 12 is disposed in spaced relation to base section 10b. The side edges of the body sections 10a and 10b are generally turned or bent outwardly from the plane of the respective section, as at 16, to provide strength and increase the spring or resilient characteristics of the body portion 10 and thus increase its resistance to contraction.

Figure 3:
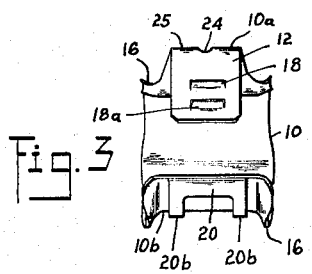
FIG. 3 is an end elevational view taken from the left-hand side of FIG. 1.

Shank portion 12 is partially severed intermediate its ends to provide inwardly and upwardly extending, vertically spaced tab or detent elements 18 and 18a for a purpose hereinafter described. The base section 10b is partially severed adjacent its free end to provide a depending tab or tongue element 20 (FIGS. 1 and 3). Such tongue element 20 comprises a generally vertically extending flange portion 20a and generally diagonally extending finger portions 20b on either side of the flange portion 20a. The partially severed portion also provides an opening 23 through the base section 10b and an abutment or shoulder 22 (FIG. 4) projecting into opening 23 and generally in the plane of base section 10b. An opening or hole 24 is provided through section 10a of the clip generally at the juncture 25 of the shank portion 12 with body portion 10, for a purpose hereinafter described.

In the embodiment of the invention illustrated in FIGS. 1 to 6, the clip or fastener device may be prelatched to the object being secured, such as a tube or the wire conduit X illustrated. Accordingly, to prelatch the clip to the wire, the latter is fed into the contractable body portion 10, and the body sections 10a and 10b thereof are squeezed or forced together, thereby causing a closing or contraction of the loop or band 10 against its spring resistance to compression, and causing the shank portion 12 of the clip to pass through opening 23 in base section 10b. During the latter movement of the shank portion, a camming action occurs between tab 18a and leading edge 28 of abutment 22 on base section 10b, which forces the shank portion 12 outwardly until the tab 18a snaps beneath the lower edge of abutment portion 22. In the latter position, the clip is in the form of a closed loop, and depending upon the diameter or size of wire being mounted, the projecting portions 14 of the loop body may engage in clamped relation the wire conduit X. In any event, the clip in the latter position, is secured in encircling or clamped relation to the wire. It will be noted that in the embodiment shown, the juncture 25 of the shank portion 12 with the remainder of the clip body is disposed generally inwardly and rearwardly of the leading edge 28 of the abutment 22 when the clip is in untensioned condition (FIG. 1), and the direction of extension of shank 12 is such to insure camming engagement of the inner surfaces of the tabs 18a and 18 with such leading edge, and the subsequent snap fasting holding action between the tabs and the abutment 22.

To secure the object such as cable, wire, etc. to the supporting panel or part, the necessary holes or openings are provided in the support P in the position which it is desired that the object shall extend when mounted. The holes Y are preferably generally elongated or of rectangular configuration to generally conform to the shape of the shank and tongue portions 12 and 20 respectively of the clip. If the clip is in its free or non-latched condition, as shown in FIG. 1 of the drawings, the tongue portion 20 is first fed into the hole Y and extends therethrough to serve to retain the clip on the supporting panel and to locate the shank 12 over the hole Y in the panel, and then the body section 10a is forced toward section 10b, as for instance by the application of force by a finger of a workman to the top of section 10a, to cause shank portion 12 to pass through opening 23 in bottom section 10b and thence through the hole Y in the panel to the fully secured position illustrated in FIGS. 5 and 6. In the latter position, the finger portions 20b of the tongue 20 of the clip preferably are slightly spaced from the outer surface of the shank portion 12 and the tab 18 is disposed in overlapping, snap-fastening engagement with the underside of the panel P. During downward movement of shank 12 through opening 23 and hole Y, the free end of shank 12 may engage the finger portions 20b of tongue 20 and thus be further guided or urged by the latter into snap-fastening engagement with abutment 22. Tab 18 is so positioned on shank portion 12 that the base section 10b of the clip is drawn into tight, abutting relation with the supporting panel, as well as securely clamping or closing the loop portion 10 about the wire, conduit, or other object being mounted. As may be seen from FIG. 6, the generally arcuate or bent configuration in a longitudinal or lengthwise direction of the base section 10b of the clip together with the fact that engagement of the base section 10b occurs only along the peripheral bent edge portions 16 thereof, aids to maintain an upward tension on the shank portion 12, to further rigidify the mounting of the clip on the panel. If the clip is prelatched to the wire or other object utilizing tab 18a and in the manner as aforediscussed, the mounting of the clip to the panel is generally the same as discussed above, with the exception that the free end of the shank portion 12 as well as the tongue portion 20 is initially received in the opening Y of the panel, prior to the further closing or contraction of the loop of the clip, and movement of the shank portion thereof to fully secured position on the panel, to thus positively locate the latching shank 12 with respect to hole Y in the panel.

In the fully attached position of the clip and associated cable on the apertured support, the engagement of the tongue 20 with the confronting defining surface of opening Y on the support, limits lengthwise movement of the clip in one direction and the engagement of the inner surface of the shank portion 12 with the confronting surface of the opening Y limits movement in the opposite direction, while outward movement of the clip from the supporting surface of panel P is prevented by the tensioned engagement of the tab 18 with the underside of the panel.

To detach the clip from secured position on the panel, a pointed tool or rod may be inserted through the aforementioned opening 24 with the end of the rod engaging the inner surface of the shank, and then utilizing the edge of the opening 24 as a fulcrum, the shank may be pivoted outwardly thereby snapping tab 18 out of interlocking relation with the underside of the panel and releasing the clip. The aforementioned slight spacing between finger portions 20b of tongue 20 and the outer surface of shank 12 facilitates movement of the clip from fully attached position, while at the same time, finger portions 20b act as an added restriction against inadvertent pivotal movement of shank 12 and unsnapping of detent 18.

Figure 7:
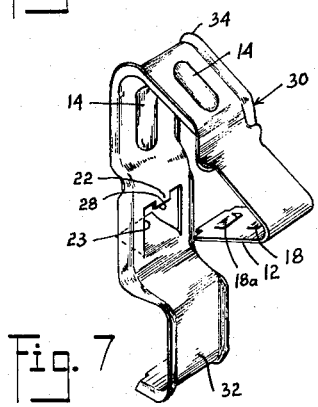
FIG. 7 is an enlarged perspective view illustrating a modification of the invention, adapted for mounting a plurality of cables or like objects on a supporting panel or part.
Figure 8:
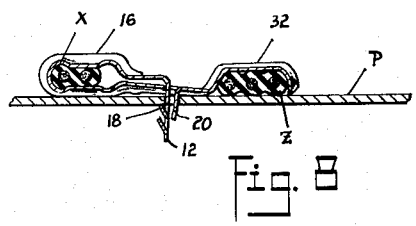
FIG. 8 is a vertical sectional view illustrating the clip device of FIG. 7 in applied position on a supporting part or panel and mounting a plurality of electrical conduits.

In FIGS. 7 and 8 there is shown a modification of the invention. In this embodiment the clip 30 comprises a structural arrangement generally similar to that of the FIGS. 1 to 6 arrangement with the addition thereto, however, of an open sided, fixed loop portion 32 secured to the adjustable loop portion 34 of the clip proper. The open side of loop portion 32 is adapted to face the confronting surface of panel P, and to receive therebetween another conduit Z, tube, flexible cable or like object in clamped relation and as shown. Thus, the FIGS. 7 and 8 embodiment of the invention provide a clip arrangement for securing a plurality of objects or cables to a supporting part.

In FIGS. 9 and 10, there is shown a further embodiment of the invention which is particularly adapted for use under a relatively wide range of variations in wire sizes as well as large variations in panel ranges or thicknesses. In this embodiment, the loop portion 36 of the clip is relatively larger than in the aforedescribed embodiments and is provided with a yieldable tongue or finger 38 struck or partially severed from the upper section of the loop portion. The tongue 38 extends diagonally downwardly into the loop area and toward the base section 40, and is adapted to resiliently engage the wire, conduit or other object to be secured. Thus, the object being secured will be clamped between the adjustable or yieldable resilient tongue 38 and the base section 40 of the clip, upon movement of shank portion 12 thereof to fully secured position on a work panel, to securely hold the object on the panel.

FIGS. 11 to 15 illustrate further modifications of the invention wherein a tab or tongue 42, 58 or 60 is provided or struck from the return or the reverse bend portion 15 of the contractable loop clip, which in the embodiment shown is generally similar to that of FIGS. 1 to 6. The tab or tongue is adapted to be received in an opening L in the panel P in generally overlapped relation with a defining edge portion of the opening, such opening L being disposed in spaced relation to the aforementioned clip fastening opening Y therein. The tab 42, 58 or 60 preferably engages or is closely spaced to the defining surfaces of the opening L, and further aids in preventing pivotal movement of the clip on the supporting panel. In addition, such tab aids in the locating or positioning of latching shank or leg 12 with respect to the receiving hole Y in the panel.

From the aforegoing description and accompanying drawings it will be seen that the invention provides a clip arrangement in the form of a contractable body for quickly and easily fastening a cable, conduit, tube or other object onto an apertured panel by a snap-fastening operation, and one that can be just as readily detached from the panel, if the latter is deemed necessary or desirable. The invention also provides a clip arrangement including means for prelatching the clip to a wire, conduit, tube or other object prior to assembling the latter on a supporting panel.

The terms and expressions which have been employed are used as terms of description and not of limitation and there is no intention in the use of such terms and expressions of excluding any equivalents of any of the features described or shown or portions thereof, but it is recognized that various modifications are possible within the scope of the invention claimed.

I claim:
1. A clip for mounting an article, such as a cable or the like, on an apertured support, said clip comprising a strip of sheet metal having spring-like characteristics and bent into the form of an open-ended generally elongated contractible loop adapted to receive in transversely extending relation the article therethrough and to hold the same in secured relation, one side of said loop forming a base section adapted for abutting engagement with the support and the other side of said loop forming a lever section, said lever section adjacent its free end having a depending shank extending inwardly toward said base section, the free end of said shank being disposed in upward vertically spaced relation to said base section to only partially close the open end of said loop in the uncontracted condition of the latter, said base section having a downwardly projecting tongue adapted to be received in the aperture in the support for retaining the clip in mounted position on the support, said base section having an opening therethrough, said shank being disposed above said opening in the uncontracted condition of said loop with the free end of said shank being movable through said opening and through the aperture in the support upon predetermined contraction of said loop, abutment means on said base section, and a plurality of generally vertically spaced abutment means on said shank, said abutment means on said base section being adapted to coact in interlocking snap fastening engagement with certain of said abutment means on said shank upon predetermined contraction of said loop whereby said loop may be held in preliminary contracted condition for prelatching the clip to the article, other of said abutment means on said shank being adapted for interlocking snap fastening engagement with the underside of a peripheral edge of the aperture in the support upon further contraction of said loop whereby the latter may be held in finalized contracted condition, for securely clamping the article in said loop and for holding said clip in attached relation on the support.

2. A clip in accordance with claim 1 wherein said abutment means on said shank comprises tabs formed from partially severed portions of said shank and extending inwardly of the loop and away from said base section.

3. A clip for mounting an article such as a cable or the like on an apertured support, said clip comprising a strip of sheet metal having spring-like characteristics and bent into the form of an open-ended generally elongated contractible loop adapted to receive in transversely extending relation the article therethrough and to hold the same in secured relation, one side of said loop forming a base section adapted for abutting engagement with the support and the other side of said loop forming a lever section, said lever section at its free end having a depending shank extending inwardly toward said base section, the free end of said shank being disposed in upward vertically spaced relation to said base section to only partially close the open end of said loop in the uncontracted condition of the latter, said base section being partially severed to form a downwardly projecting tongue adapted to be received in the aperture in the support for retaining the clip in mounted position on the support, said partially severed tongue providing an opening through said base section, said shank being disposed above said opening in the uncontracted condition of said loop with the free end of said shank being movable through said opening upon predetermined contraction of said loop, abutment means on said base section adjacent said opening therethrough and on said shank adapted for snap fastening interlocking coaction when said loop is contracted a predetermined amount to selectively hold the loop in closed preliminary contracted condition and thus provide for prelatching said clip to the article, said free end of said shank being adapted to be received through the aperture in the support, and other abutment means on said shank disposed in generally vertical upwardly spaced relation to said first mentioned abutment means on said shank adapted for snap fastening interlocking coaction with the underside of a peripheral edge of the aperture in the support upon further contraction of said loop, to hold said loop in finalized contracted condition and to prevent movement of said clip outwardly away from the support, said shank being adapted to coact with said tongue in the aperture to prevent longitudinal and transverse movement of said clip on the support.

4. In a fastening device in accordance with claim 3 wherein said abutment means on said shank comprises a plurality of tabs partially severed from said shank and extending inwardly and upwardly away from said base section and said abutment means on said base section comprises a transversely extending shoulder formed from a partially severed portion of said base section, said tabs upon downward movement of said shank toward said base section engaging in camming coaction with said shoulder thereby forcing said shank portion outwardly until snap fastening relation occurs between the respective tab and the underside of said shoulder.

5. In a fastening assembly comprising a support such as a panel or the like, said support having an aperture therethrough, a clip mounted on said support over said aperture, said clip comprising a strip of sheet metal having spring-like characteristics and bent into the form of an open ended generally elongated contractible loop, an elongated article such as a cable or the like received in transversely extending relation through said loop and being held by the latter in secured relation on said support, one side of said loop forming a base section engaging in abutting relation said support and the other side of said loop forming a lever section, said lever section at its free end having a depending shank extending inwardly toward said base section, the free end of said shank being initially disposed in upward vertically spaced relation to said base section to only partially close the open end of said loop in an uncontracted condition of the latter, said base section being partially severed to form a downwardly and generally diagonally projecting tongue received in said aperture, said partially severed tongue providing an opening through said base section, the free end of said shank extending through said opening in said base section and through said aperture in said support, abutment means on said base section adjacent said opening therethrough, abutment means on said shank adapted for snap fastening interlocking coaction with said abutment means on said base section when said loop is contracted a predetermined amount for providing for preliminary contraction and closing of said loop to prelatch said clip to said article, and other abutment means on said shank disposed in generally vertically upward relation with respect to said first mentioned abutment means, said other abutment means engaging in snap fastening interlocking coaction with the underside of a peripheral edge of said aperture in said support to hold said loop in finalized contracted condition and to prevent movement of said clip outwardly from said support, said shank coacting with said tongue in said aperture to prevent longitudinal and transverse movement of said clip on said support, and means on said lever section and said shank for facilitating release of said other abutment means on said shank from interlocking coaction with said edge of said aperture to permit removal of said clip from said support in a direction outwardly therefrom.

6. A clip for mounting an article, such as a cable and the like, on an apertured support, said clip comprising a strip of sheet metal having spring like characteristics and bent into the form of an open-ended generally elongated contractable loop adapted to receive in transversely extending relation the article therethrough, and to hold the same in secured relation, one side of said loop forming a base section adapted for abutting engagement with the support and the other side of said loop forming a lever section, said lever section adjacent its free end having a depending shank extending inwardly toward said base section, the free end of said shank being disposed in upward vertically spaced relation to said base section to only partially close the open end of said loop in the uncontracted condition of the latter, said base section having a downwardly projecting tongue adapted to be received in the aperture in the support, for retaining the clip in mounted position on the support, said base section having an opening therethrough, said shank being disposed above said opening in the uncontracted condition of said loop with the free end of said shank being movable through said opening and through the aperture in the support upon predetermined contraction of said loop, abutment means on said base section and a plurality of generally vertically spaced abutment means on said shank, said abutment means on said base section being adapted to coact in interlocking snap fastening engagement with certain of said abutment means on said shank upon predetermined contraction of said loop, whereby said loop may be held in preliminary contracted condition for prelatching the clip to the article, other of said abutment means on said shank being adapted for interlocking snap fastening engagement with the underside of a peripheral edge of the aperture in the support upon further contraction of said loop, whereby the latter may be held in further contracted condition, and said lever section being provided with a yieldable finger extending inwardly of said loop and toward said base section, said finger being adapted to yieldably engage the article being mounted for clamping the article in said loop.

7. A clip for mounting an article, such as a cable and the like on an apertured support, said clip comprising a strip of sheet metal having spring-like characteristics and bent into the form of an open ended generally elongated contractable loop, adapted to receive in transversely extending relation the article therethrough and to hold the same in secured relation, one side of said loop forming a base section adapted for abutting engagement with the support and the other side of said loop forming a lever section, said lever section adjacent its free end having a depending shank extending inwardly toward said base section, said base section having a downwardly projecting tongue adapted to be received in the aperture in the support for retaining the clip in mounted position on the support, said base section having an opening therethrough, said shank being generally aligned with said opening with said shank being movable through said opening and through the aperture in support upon predetermined contraction of said loop, abutment means on said base section and a plurality of generally vertically spaced abutment means on said shank, said abutment means on said base section being adapted to coact in interlocking snap fastening engagement with the lowermost of said abutment means on said shank upon predetermined contraction of said loop, whereby said loop may be held in preliminary contracted condition for prelatching the clip to the article, the upper of said abutment means on said shank being adapted for interlocking snap-fastening engagement with the underside of a peripheral edge of the aperture in support upon further contraction of said loop, whereby the latter may be held in further contracted condition for securely clamping the article in said loop, and for holding said clip in attached relation to the support.

References Cited in the file of this patent

UNITED STATES PATENTS

| 2,372,683 | Robertson | Apr. 3, 1945 |
| 2,531,911 | Johnson | Nov. 28, 1950 |
| 2,618,033 | Tinnerman | Nov. 18, 1952 |
| 2,759,390 | Edwards | Aug. 21, 1956 |

FOREIGN PATENTS

| 686,971 | Great Britain | Feb. 4, 1953 |
| 713,575 | Great Britain | Aug. 11, 1954 |